Patented May 5, 1931

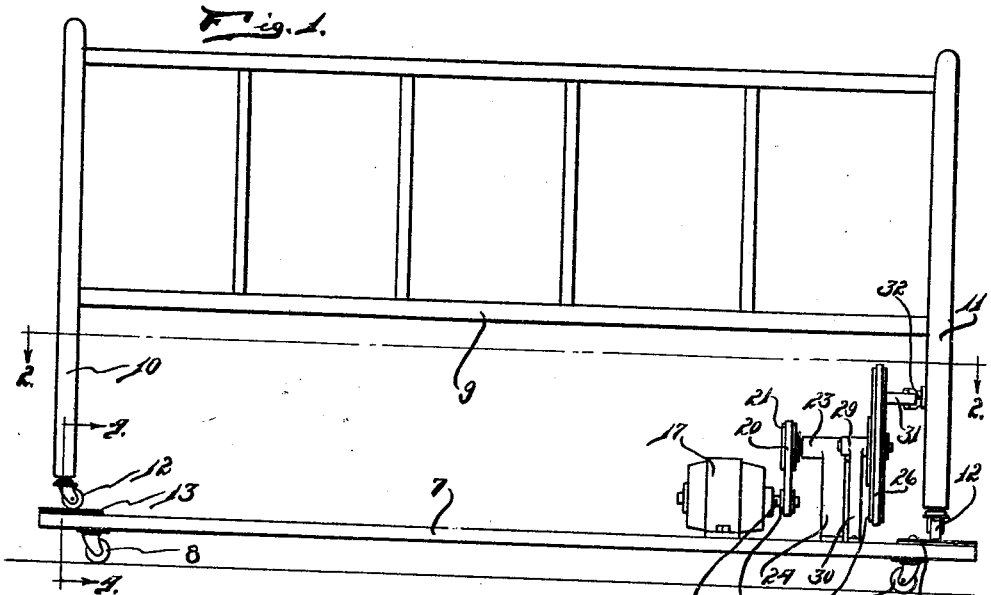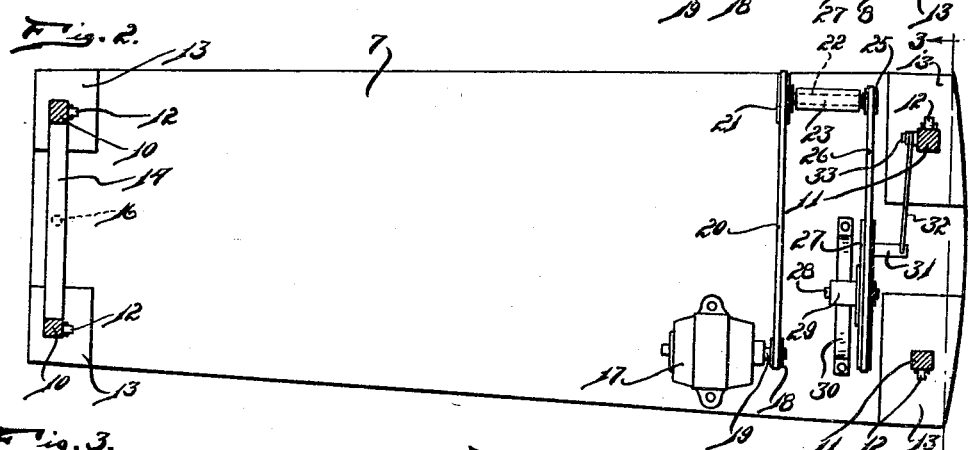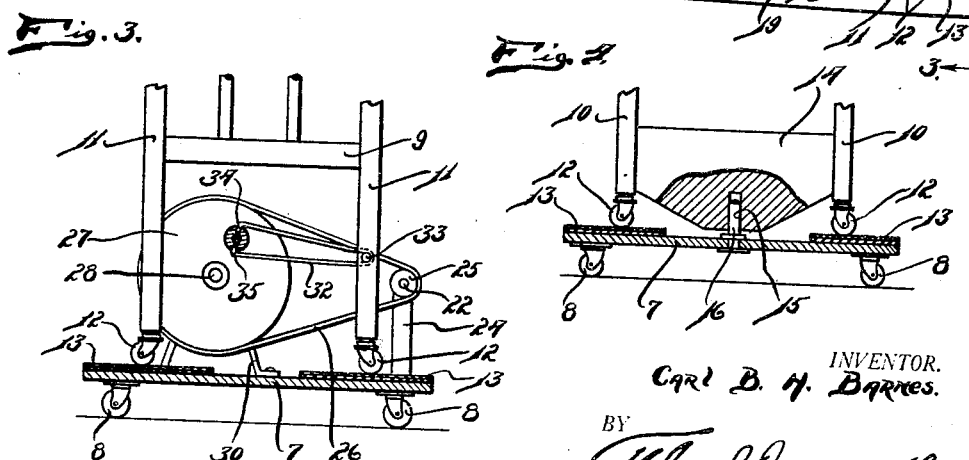

1,803,887

UNITED STATES PATENT OFFICE

CARL B. H. BARNES, OF DETROIT, MICHIGAN

ELECTRICALLY OPERATED CRADLE

Application filed February 1, 1930. Serial No. 425,135.

My invention relates to a new and useful improvement in an electrically operated cradle and has for its object the provision of a cradle with mechanism attached thereto whereby the cradle may be oscillated from side to side.

Another object of the invention is the provision of a supporting base with a cradle pivotally mounted thereon at one end and provided with mechanism for oscillating said cradle on its pivoted end.

Another object of the invention is the provision of a device of this class which will be simple in structure, economical of manufacture, and highly efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention.

Fig. 2 is a view taken on line 2—2 of Fig. 1.

Fig. 3 is a fragmentary view taken on line 3—3 of Fig. 2.

Fig. 4 is a fragmentary view taken on line 4—4 of Fig. 1.

In the invention I provide a base 7 mounted on castors 8 so that the device may be wheeled about from place to place in the housing. A cradle comprising a crib 9 is supported on legs 10 at one end and legs 11 at the other end, these legs being each provided at their lower ends with castors 12 resting on metallic wear plates 13 which are mounted on the upper surface of the base 7.

A bolster 14 connects the legs 10 and has formed centrally therein in its edge a socket 15 in which engages a pivot pin 16 which extends through and projects upwardly from the base 7.

Mounted on the base 7 is an electric motor 17. A pulley 18 mounted on the shaft 19 of the motor is connected by the belt 20 to a pulley 21 mounted on the shaft 22 which extends through the bearing 23 carried by the upper end of the standard 24 which projects upwardly from the base 7. A pulley 25 is fixedly mounted on the shaft 22 and connected by the belt 26 to the pulley 27 which is fixedly mounted on the shaft 28 journaled in the bearing 29 carried on the upper end of the standard 30 which projects upwardly from the base 7. A stud 31 projects excentrically outwardly from one face of the pulley 27.

A wire loop 32 is positioned in embracing relation on a stud or bolt 33 which extends outwardly from the inner face of one of the legs 11. The ends 34 of this loop 32 are snapped into sockets 35 formed in the stud 31.

In operation, when the motor 17 is operated, the pulley 27 is rotated so that the loop 32 serves as a pitman to effect oscillating movement of the cradle on the pin 16 as a pivot.

With a structure formed in this manner, the rocking of an infant may be effected without requiring the attention of the mother or nurse thus leaving these individuals free for other work.

While I have illustrated and described the preferred form of constructions of my invention, I do not wish to limit myself to the precise details of structure shown but desire to avail myself of such variations and modifications as may come within the scope of the appended claim.

Having thus described my invention, what I claim as new and desire to secure by Letters Patent is:

A device of the class described, comprising: a portable base; wear plates on the upper surface of said base at opposite ends thereof; a cradle; supporting standards for supporting said cradle and engaging said wear plate; a bolster secured to said standards at one end of said cradle; a pin projecting into said bolster for pivotally connecting one end of said cradle to said base; and power driven means for oscillating said cradle on said pin as a pivot.

In testimony whereof I have signed the foregoing specification.

CARL B. H. BARNES.